United States Patent [19]

Kostecki et al.

[11] Patent Number: 5,029,730

[45] Date of Patent: Jul. 9, 1991

[54] WELDABLY SEALED OXYGEN CONTAINER

[75] Inventors: Mary A. Kostecki; Robert C. Guth; James P. Lyons; Donald G. Seliner; Luther S. Moore, all of St. Louis County, Mo.

[73] Assignee: Sparklet Devices, Inc., St. Louis, Mo.

[21] Appl. No.: 411,901

[22] PCT Filed: Mar. 23, 1989

[86] PCT No.: PCT/US89/01248

§ 371 Date: Jul. 20, 1989

§ 102(e) Date: Jul. 20, 1989

[51] Int. Cl.[5] .......................... B67D 5/00; F16K 15/20

[52] U.S. Cl. .......................................... 222/3; 137/223; 137/232

[58] Field of Search ................. 222/3; 220/359, 89 A, 220/89 B, 85 P; 137/223, 232

[56] References Cited

U.S. PATENT DOCUMENTS

| | | | |
|---|---|---|---|
| 639,412 | 12/1899 | Lejeune | 222/3 |
| 1,570,397 | 1/1926 | Preston | 137/232 |
| 1,951,926 | 3/1934 | Davidson | 220/89 A |
| 2,284,971 | 6/1942 | Broecker | 137/232 |
| 2,357,620 | 9/1944 | Thomas | 220/89 B |
| 2,685,383 | 8/1954 | Kockner | 220/3 |
| 2,822,817 | 2/1958 | Benzel | 137/223 |
| 3,618,822 | 11/1971 | Hildenbrandt | 222/3 |
| 4,054,163 | 10/1977 | Brown, Jr. et al. | 220/89 A |
| 4,171,119 | 10/1979 | Lamson | 137/223 |
| 4,766,628 | 8/1988 | Walker | 137/232 |

*Primary Examiner*—Michael S. Huppert
*Assistant Examiner*—Shari Wunsch
*Attorney, Agent, or Firm*—Kalish & Gilster

[57] ABSTRACT

A sealed oxygen container having a filling neck is provided with a heat welded closure cap. A valve is positioned within the neck. The valve enables the container to be filled with oxygen and then seals the oxygen therein preventing oxygen from escaping during heat welding of the closure cap. The heat welded cap may then be readily pierced so that oxygen can be dispsensed.

7 Claims, 2 Drawing Sheets

FIG. 6
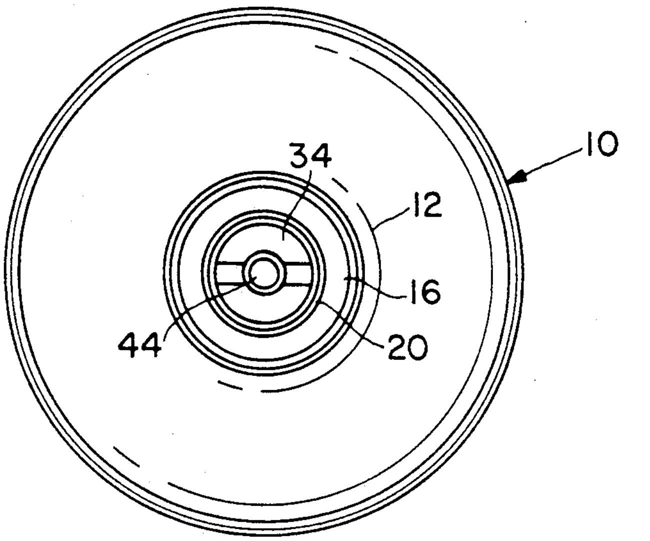
FIG. 7
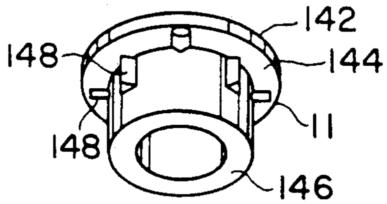
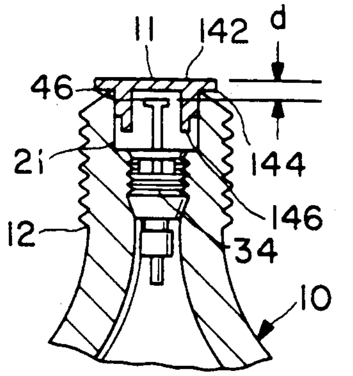
FIG. 8
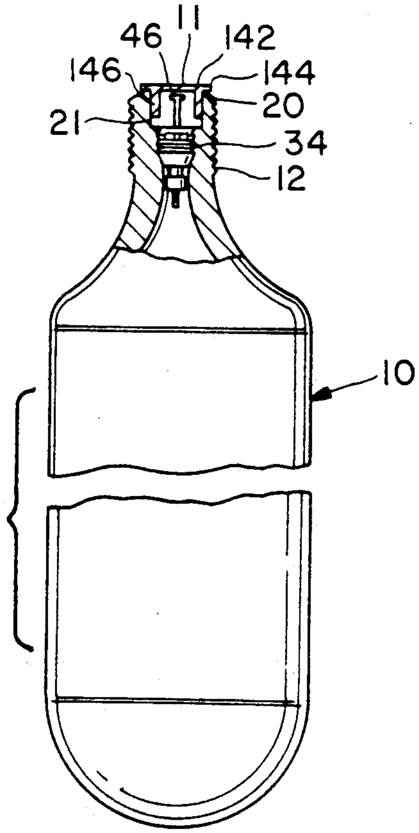
FIG. 1

WELDABLY SEALED OXYGEN CONTAINER

BACKGROUND OF THE INVENTION

1. Field of the Invention

The present invention generally relates to sealed oxygen containers and, more particularly, is concerned with oxygen containers that are weldably sealed and may be readily opened for quick discharge of the contained gas.

2. Brief Description of the Prior Art

Generally speaking, cylinders containing compressed gases are well-known. Compressed gases can be stored in large cylinders and dispensed with valves and regulators. Large cylinders of the type used for welding are refilled through open necks that are provided with mechanical closure devices. Such cylinders usually contain compressed gases of the type including carbon dioxide, methane, nitrogen, and oxygen.

In addition to the aforementioned large cylinders generally used for commercial or industrial applications, smaller compressed gas cylinders have wide applicability. Such uses include containment of nitrous oxide for whipping cream, nitrogen for low temperature applications, carbon dioxide for carbonated beverages and dry ice formation, among others, but not containment of oxygen. These small cylinders are usually sealed by mechanical crimping or pressure welding a closure cap onto the cylinder filling neck. There are usually no adverse reactions that could result from these sealing procedures.

However, a very definite need exists in many applications for small, that is approximately 10-30 grams, oxygen cylinders which could be used to inflate life jackets, safety hoods for fire fighters, smoke hoods for immediate breathing sources for people trapped in a confined area wherein a fire may occur, such as in an airplane, or for use by miners working in an environment containing contaminated gases.

Sealing small oxygen cylinders presents several problems. First, the pressure of the contained gas is usually so high, as in the order of approximately 3,000 psi, that a mechanical seal such as a crimped closure cap is not satisfactory. Even if a crimped cap could be successfully inserted and held within the cylinder filling neck, oxygen will gradually start to leak out within a relatively short period of time. This deficiency is clearly shown in U.S. Pat. No. 2,685,383 issued to W.B. Kochner. In this patent, a pressure bulb cap is welded onto the neck of a pressure bulb that contains carbon dioxide. The technique disclosed by Kochner would not be suitable for pressure bulbs that may be charged with oxygen contained under high presure. The oxygen would leak out through the filling neck and remain in the vicinity where welding would occur. The likely occurrence of an explosion is readily apparent.

The most suitable procedure for sealing small cylinders filled with oxygen would be providing a barrier within the cylinder filling neck so that oxygen could not escape from the cylinder thereby allowing a closure cap to be heat welded onto the filling neck without damage. Presently, there does not appear to be a procedure whereby oxygen can be contained within the cylinder and not leak into the atmosphere adjacent to the area where the closure cap would be heat welded. The heat generated by electric fusion welding in combination with oxygen in the immediate vicinity of the cylinder filling neck is likely to create a potential for a highly explosive environment.

Thus, the advantages offered by, and the need for, small oxygen-filled cylinders is apparent. This need will become more acute as, for example, solutions to get passengers off burning airplanes, providing safety hoods for fire fighters and miners obtains more recognition by public and private agencies. A need exists for oxygen-containing cylinders that can be rendered safe to allow a closure cap to be heat welded thereon.

SUMMARY OF THE INVENTION

The present invention provides a cylinder containing compressed oxygen having a heat or electrically welded closure cap. In usage, the cap may readily be pierced, thus providing ready access to a valve for dispensing the contained oxygen. The valve is positioned in the filling neck of the cylinder and serves two purposes: firstly, it permits the cylinder to be filled with compressed oxygen from some external source. Secondly, and of particular importance to this invention, the valve serves as a barrier thereby preventing oxygen from escaping during heat welding, through the filling neck into the atmosphere. Retaining all the oxygen within the cylinder is an essential feature of this invention because heat welding of the closure cap can now be safely accomplished. The possibility of an explosion caused by the combination of heat or sparks from welding and oxygen escaping into a cylinder filling neck is avoided. Thus, a sealed cylinder of oxygen can be achieved.

Accordingly, the present invention relates to a weldably sealed oxygen container which is provided with a tubular filling neck, a valve located within the filling neck that permits filling of the cylinder with oxygen and sealing the oxygen within the cylinder and a closure cap positioned within the filling neck and welded thereto. The closure cap can be readily pierced whereby access to the valve is facilitated and dispensing of the contained oxygen can be achieved.

Accordingly, it is an object of this invention to provide an oxygen container wherein a barrier is positioned within the filling neck.

It is a further object of the present invention to provide an oxygen container that has a readily pierced heat welded closure cap.

It is another object of the present invention to provide an oxygen container wherein a valve is located within the container filling neck that enables the container to be filled with oxygen and then seals the oxygen therein preventing contact with a closure cap during heat welding of the cap onto the filling neck.

A still further object of this invention is to provide a method for producing containers filled with oxygen that have heat welded closure caps that may be readily pierced so that oxygen can be dispersed.

BRIEF DESCRIPTION OF THE DRAWINGS

FIG. 1 is a vertical view in partial section of an oxygen cylinder filled with oxygen and having a closure cap affixed therein in accordance with the present invention.

FIG. 6 is a top plan view of an oxygen cylinder showing the location of a valve and a valve actuator pin.

FIG. 7 is a perspective view of a closure cap.

FIG. 8 is an enlarged partial vertical sectional view through an oxygen cylinder filling neck showing a closure cap affixed thereon and relationship of the closure cap top surface and a valve actuator pin.

DETAILED DESCRIPTION OF THE PREFERRED EMBODIMENT

Figure 2:
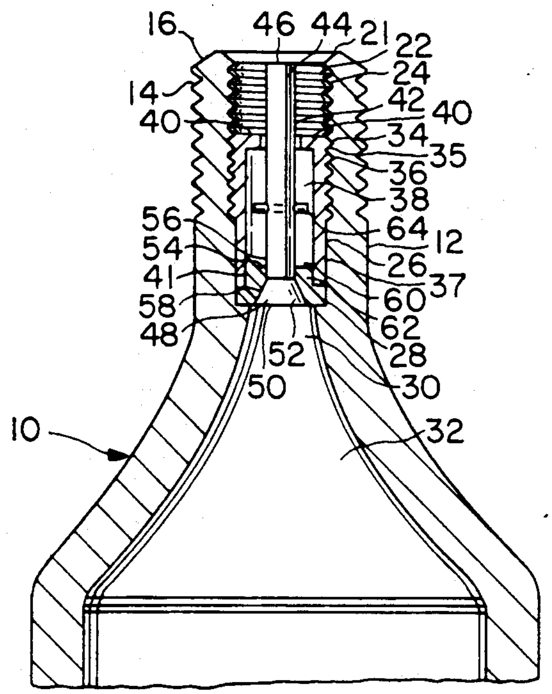
FIG. 2 is a partial vertical sectional view through an oxygen cylinder showing a valve that functions as a barrier and dispenser positioned within the filling neck.

Referring now by reference characters to the drawings, and more particularly to FIG. 1, there is shown in vertical section a cylinder, generally designated 10, for containing compressed oxygen under high pressure, typically in the range of 3,000 psi. Positioned within filling neck 12 of cylinder 10 is a valve 34 that permits the cylinder to be filled with compressed gas, particularly oxygen and being under the pressure of the contained oxygen also serves as a barrier to seal the oxygen within the cylinder against premature discharge. A closure cap 11 is inserted into the open upper end of filling neck 12 and secured thereto by heat welding.

FIGS. 1-5 and more particularly FIGS. 2-5 show illustrate vertical sectional views of gas cylinders 10 each having a valve with a different construction positioned within filling neck 12. The same type of cylinder or pressure bulb is used with each valve, thus describing the cylinder construction in FIG. 2 will be applicable to the cylinder constructions shown in FIG. 3, 4 and 5. Neck 12 which is of annular vertical section which is externally threaded, as at 14, terminates at upper bevelled edge 16 and includes a top end surface 18 having annular sealing rim 20.

Filling neck 12 includes a round passage 21 located in the center of top surface 18, in communicating alignment with aperture 30 of upper diverging cylinder section 32. Passage 21 includes upper threaded counter bore 24 and lower smooth bore 26. A shoulder or seating portion 28 is formed at the intersection of smooth bore 26 and aperture 30.

FIG. 1 illustrates a valve 34 disposed within filling neck 12. As shown in greater detail in FIG. 2, valve 34 includes a casing 35 externally threaded in its upper body portion 36 and having a lower depending smooth wall portion 37 complimentary to bore 26. Valve 34 and upper end portion 40 have a central fluid inlet port 42. An actuator pin 44, having upper actuating end 46 normally projecting through port 42 and a fluid lower sealing end 48 is positioned within opening 42. Sealing end 48 further includes flat lower end face 50 and conical sealing surface 52. A sealing member 54 having a fluid outlet port 56 with internal conical sealing surface 58 that complimentarily corresponds with conical sealing surface 52, internal diameter 60 that complimentarily corresponds to internal bore 38, and annular shoulder section 62 is inserted into open end 41 of body portion 36. Actuator pin 44 is provided with a perpendicularly oriented retaining cross pin 64 that extends laterally of pin 44 and retains the pin within valve 34 by virtue of having an extent greater than opening 56, thus preventing it from falling into cylinder internal section 32. When cylinder 10 is being filled, retaining pin 64 will generally rest on the upper surface of sealing member 54.

Figure 3:
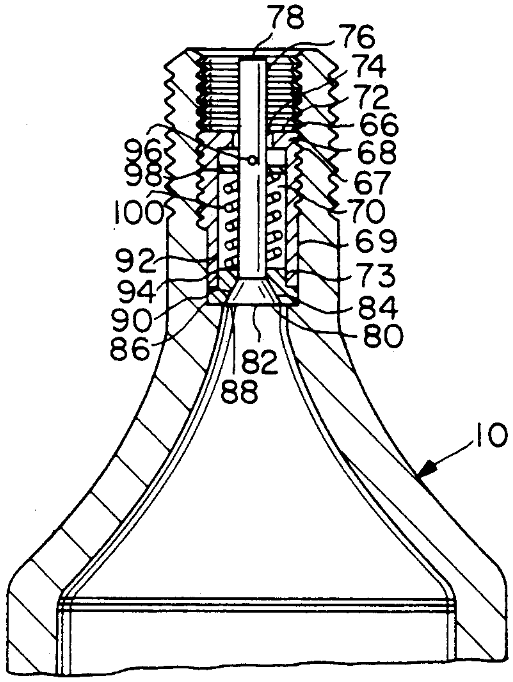
FIG. 3 is a partial vertical sectional view through an oxygen cylinder showing another valve that functions as a barrier and dispenser, having a spring retainer, positioned within the filling neck.

With reference to FIG. 3, there is shown another valve 66 of different construction than described and shown in FIG. 2. Valve 66 also serves as a barrier and dispenser suitable for oxygen and includes a casing 67 externally threaded in its upper body portion 68 and having a lower smooth wall portion 69 complimentary to bore 26. Valve 66 also contains internal bore 70, upper end portion 72 having a central fluid inlet port 74. An actuator pin 76, having upper actuating end 78 normally projecting through port 74, and lower sealing end 80 is positioned within port 74. Sealing end 80 further includes flat lower end face 82 and conical sealing surface 84. A sealing member 86 having a fluid outlet port 88 with internal conical sealing surface 90 that complimentarily corresponds with sealing surface 84, an internal diameter 92 that complimentarily corresponds to internal bore 70, and annular shoulder section 94 is inserted into open end 73 of body portion 68. Actuator pin 78 further includes a perpendicularly oriented retaining cross pin 96 that extends laterally of pin 78 and is located at its approximate mid point. A retaining washer 98 is placed adjacent cross pin 96 toward sealing end 80 of actuator pin 78. A helical spring 100 is located on the actuator pin between washer 98 and sealing member 86. Spring 100 urges actuator pin sealing surface 84 into sealing contact with sealing surface 90 of sealing member 86.

Figure 4:
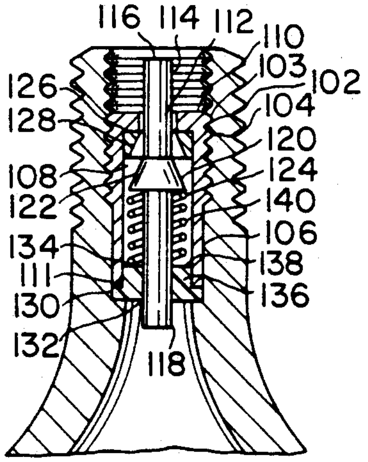
FIG. 4 is a partial vertical sectional view through an oxygen cylinder showing a further form of valve that functions as a barrier and dispenser having two seals and a spring retainer positioned within the filling neck.

FIG. 4 illustrates a valve 102 of a different construction than heretofore described in FIGS. 2 and 3 that is adapted for use with oxygen and likewise functions as a barrier and dispenser. Valve 102 includes a casing 103 externally threaded in its upper body portion 104 and having a lower smooth wall portion 106 complimentary to bore 26. Valve 102 further contains internal bore 108, upper end portion 110 having a fluid inlet port 112. An actuator pin 114, having upper actuating end 116 normally projecting through port 112 and lower discharge end 118 is positioned within port 112. Located on actuator pin 114 is sealing valve 120 that includes conical sealing surface 122 and flat end surface 124. Upper end portion 110 further contains internal sealing member 126 having internal conical sealing surface 128 that complimentarily corresponds with sealing surface 122. A second sealing member 130 having a fluid outlet port 132, an internal diameter 134 that complimentarily corresponds to internal bore 108, annular shoulder section 136 and top surface 138 are provided in open end 111 of body portion 104. A helical spring 140 is located on actuator pin 114 between surfaces 124 and 138 and urges actuator pin sealing valve 122 into sealing contact with sealing surface 128.

Figure 5:
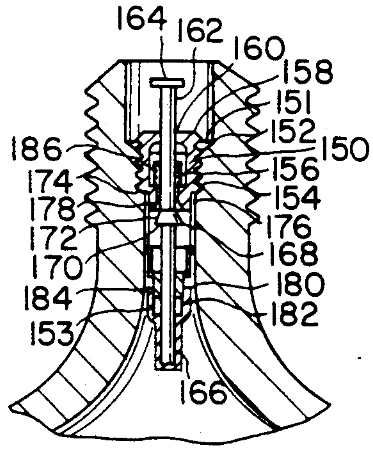
FIG. 5 is a partial vertical sectional view through an oxygen cylinder showing a still further form of valve that functions as a barrier and dispenser positioned within the filling neck.

Referring to FIG. 5, there is illustrated a valve 150 having a different construction than heretofore described in FIGS. 2-4 that is also especially useful with oxygen and serves as a barrier and dispenser. Valve 150 includes a casing 151 externally threaded in its upper body portion 152 and having a lower smooth wall portion 154 complimentary to bore 26. Valve 150 contains internal bore 156, upper end portion 158 having a fluid inlet port 160 An actuator pin 162 having upper actuating end 164 normally projecting outward through port 160 and lower actuator end 166 is positioned within port 160. Located on actuator pin 162 is sealing valve 168 that includes flat section 170 and conical sealing surface 172. A tapered sealing member 174 having annular rim 176 that further includes internal conical sealing surface 178 that complimentarily corresponds with conical sealing surface 172 is located within lower portion 154. A first smooth barrel member 180 and second smooth barrel member 182 are provided within lower end 153 of body portion 152. A fluid discharge port 184 is positioned at the juncture of first smooth barrel member 180 and second smooth barrel 182. A helical spring 186 is located on actuator pin 162 and urges actuator sealing member 168 into sealing contact with sealing surface 172 of sealing member 174.

FIG. 6 shows a top view of cylinder 10, filling neck 12 that includes bevelled edge 16, and annular sealing rim 20. Valve 34 with actuator pin 44 also appears in this view.

The construction of closure cap 11 is more clearly understood by reference to FIG. 7. Cap 11 is manufactured from steel stock of a composition that enables it to be readily heat welded by electric fusion welding onto the cylinder filling neck 12 and includes a thin circular top 142 which may be readily pierced as hereinafter more fully described. The diameter of top 142 is essentially the same as the diameter of annular sealing rim 20 and is provided with an annular flange portion 144, and a series of projections 148 which serve to enhance fusion of the cap after heat welding within filling neck 12. A thick annular wall portion 146 that is dimensioned so as to snuggly fit within bore 21 of filling neck 12 is further provided.

The present invention can be clearly understood by reference to FIGS. 1 and 8. These figures show cylinder 10 that is filled with oxygen under pressure of approximately 3,000 psi. Valve 34 is contained entirely within filling neck 12 and enables cylinder 10 to be filled with oxygen from a large supply source under substantial pressure. After the cylinder is filled to a predetermined volume, pressure of the oxygen within the cylinder forces valve 34 into a typically closed condition to act as a barrier and prevent the escape of any oxygen from cylinder 10 through filling neck 12. Thus, closure cap 11 can be safely heat welded onto filling neck 12 since the potentially explosive combination of heat and oxygen will be avoided. As more clearly shown in FIG. 8, it is noted that annular flange 144 contacts sealing rim 20 and annular wall 146 contacts the surrounding portions of passage 21 thereby forming an effective barrier and sealing oxygen within cylinder 10. It should be further noted that actuator pin end 46 is spaced a distance "d" shown below closure cap top surface 142. This is a critical dimension because contact between closure cap 11 and actuator pin end 46 must be avoided so that oxygen is not inadvertently dispensed when cap 11 is inserted into filling neck 12 and welded thereto. This spacing can be accomplished by establishing the dimensions of passage 21, counter-bore 24, bore 26, aperture 30 and shoulder or seat portion 28 that is formed at the juncture of bore 26 and aperture 30. Thus, any of the previously described valves effectively serve as a barrier when they are threadably engaged within filling neck 12 so that their lower sealing members will contact shoulder 28. When this contact is made the valve is properly located within the filling neck and an effective barrier preventing the escape of oxygen is provided. Placement and electric fusion welding of the closure cap can now effectively and safely be accomplished.

We claim:

1. A heat-weldably sealed oxygen container comprising:

a container having a filling neck;

barrier means located entirely within said filling neck; and a closure cap positioned externally of said barrier means within said filling neck and heat welded to said filling neck; said barrier means comprising a valve having an externally threaded body portion, a centrally positioned vertical actuator pin and an annular seal portion threadably engaged in said filling neck so that said annular seal contacts an annular seat for simultaneously providing the functions of filling and selectively dispensing oxygen to and from said container, whereby to provide a container which may be safely filled with oxygen and thereafter heat-weldably sealed without danger of explosion.

2. The sealed oxygen container as recited in claim 1, wherein the filling neck has a centrally located passage with an upper threaded counter-bore, an adjacent smooth bore, an aperture that communicates directly with the interior of said container and an annular seat formed at the juncture of said smooth bore and said aperture.

3. A sealed oxygen container as recited in claim 1, wherein said closure cap further comprises:

a thin circular top having a sufficient diameter to cover the top of said filling neck and being outwardly spaced from said actuator pin, a solid depending tubular wall of substantially less internal diameter than said filling neck passage is positioned within said filling neck and welded thereto.

4. The sealed oxygen container as recited in claim 1, wherein said container is a resistance weldable metal so that said closure cap can be weldably fused thereto.

5. A weldably sealed oxygen container, having a closure cap of resistance weldable metal, comprising:

a container of resistance weldable metal having a filling neck, said neck having a centrally located passage with an upper threaded counter-bore, an adjacent smooth wall bore, an aperture that communicates directly with the interior of said container, an annular seat formed at the juncture of said smooth bore and said aperture;

valve means having an externally threaded body portion, a centrally positioned vertical actuator pin and an annular seal portion, threadably engaged in said filling neck so that said annular seal contacts said annular seat; and a closure cap having a thin circular top of sufficient diameter to cover the top surface of the upper end of said neck and being spaced from said vertical actuator pin, a solid depending tubular wall of substantially less internal diameter than said passage is positioned within said filling neck and welded thereto.

6. A method for providing an oxygen filled container for dispensing oxygen having appreciable cap heat wielded thereto, said method comprising the steps:

providing a container of resistance weldable metal having a filling neck;

inserting a valve entirely within the filling neck to allow said container to be filled and to simultaneously prevent the unintended escape of oxygen through the filling neck and to allow selective dispensation of oxygen;

filling the container with oxygen;

providing a closure cap to the filling neck; and applying electric resistance e welding to secure the cap to the neck to thereby heat-weldably seal the oxygen-filled container without danger of explosion.

7. The method of claim 6 further comprising the steps of:

selectively dispensing oxygen from said cylinder by piercing said closure cap; and contacting said valve so that oxygen is permitted to pass through said valve into said filling neck.

* * * * *

UNITED STATES PATENT AND TRADEMARK OFFICE

CERTIFICATE OF CORRECTION

PATENT NO. : 5,029,730

DATED : July 9, 1991

INVENTOR(S) : Mary A. Kostecki; Robert C. Guth; James P. Lyons; Donald G. Seliner; Luther S. Moore It is certified that error appears in the above-identified patent and that said Letters Patent is hereby corrected as shown below:

Claim 6, column 6, line 59, change " appreciable" to --a pierceable--; and column 7, line 2, after "resistance", delete "e".

Signed and Sealed this

Thirteenth Day of October, 1992

*Attest:*

DOUGLAS B. COMER

*Attesting Officer*

*Acting Commissioner of Patents and Trademarks*